(12) United States Patent
Nowak et al.

(10) Patent No.: US 8,974,614 B2
(45) Date of Patent: Mar. 10, 2015

(54) POWDER METALLURGICAL ARTICLE AND PROCESS

(75) Inventors: Daniel Anthony Nowak, Greenville, SC (US); Raymond Joseph Stonitsch, Greenville, SC (US); Attila Szabo, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1205 days.

(21) Appl. No.: 12/651,756

(22) Filed: Jan. 4, 2010

(65) Prior Publication Data

US 2011/0165432 A1 Jul. 7, 2011

(51) Int. Cl.
*C22F 1/10* (2006.01)
(52) U.S. Cl.
USPC ............... 148/675; 219/121.35; 219/121.85; 219/137 R; 428/615

(58) Field of Classification Search
USPC .............. 416/204 R; 148/675; 219/121.35, 219/121.85, 137 R; 428/615
IPC .......... B22F 3/17,5/009; C21D 2251/04; B23K 2201/001; C22C 1/0433
See application file for complete search history.

(56) References Cited

U.S. PATENT DOCUMENTS

| 8,414,267 B2 * | 4/2013 | Ganesh et al. ............ 416/213 R |
| 2011/0076147 A1 * | 3/2011 | Ganesh et al. ............ 416/204 R |

\* cited by examiner

*Primary Examiner* — Weiping Zhu
(74) *Attorney, Agent, or Firm* — McNees Wallace & Nurick LLC

(57) ABSTRACT

A powder metallurgical article and process are disclosed. The article is a repaired or enlarged powder metallurgical article. The repaired or enlarged powder metallurgical article includes a formed article including a first alloy and a material including a second alloy. The material is welded to the formed article to form the repaired or enlarged powder metallurgical article. The repaired or enlarged powder metallurgical article includes a substantially uniform grain structure.

17 Claims, 4 Drawing Sheets

POWDER METALLURGICAL ARTICLE AND PROCESS

FIELD OF THE INVENTION

The present disclosure generally relates to powder metallurgical articles and processes. In particular, the present disclosure relates to a welding process and an enlarged or repaired powder metallurgical article formed by a formed article and a material added to the formed article, the enlarged or repaired powder metallurgical article having a substantially uniform grain structure.

BACKGROUND OF THE INVENTION

Many superalloys have been developed. Of the many superalloys that have been developed, only a few have been adopted for use. Often, the expense of using a new alloy exceeds the benefit associated with using the new alloy. Due to this expense of using a new alloy, the properties of many alloys are not exploited.

In the past, articles have been formed by conventional forging techniques. The conventional forging techniques can be expensive, can only be performed by a few facilities, can result in unusable scrap material, and can be susceptible to cracking, oxidation, and/or contamination by foreign objects.

Alternative to conventional forging techniques, some alloys can be formed through powder metallurgy processes. The powder metallurgy process can include remelting a preliminary ingot then atomizing it into small droplets that solidify as miniature ingots with limited or no segregation of alloy elements. The powders are consolidated by hot isostatic pressing and/or by extrusion and processed to achieve as much as 100% density. The aggregates are generally homogenous and can display uniform properties. Sometimes, the powder can be pressed directly to form a final size/shape, but usually the powder is compacted to an intermediate stage (for example, extruded billet) and forged to final form. Powder metallurgy can be expensive, but can result in savings on subsequent machining costs, the ability to control defects, and the ability to use very high strength compositions.

Alloys formed from powder metallurgy can be difficult to weld. Furthermore, in the past, adding additional alloy to articles formed from powder metallurgy resulted in inconsistent grain structure.

BRIEF DESCRIPTION OF THE INVENTION

In an exemplary embodiment, a method of forming an enlarged powder metallurgical article includes determining a size of a formed article, the formed article comprising a first alloy, positioning the formed article and a material, the material comprising a second alloy, and increasing the size of the formed article by adding the second alloy material. In the embodiment, the enlarged article includes a substantially uniform grain structure between the formed article and the added second alloy material.

In another exemplary embodiment, a method of repairing a formed powder metallurgical article includes identifying an undesirable feature of the formed article, the formed article comprising an alloy, positioning the formed article and a material, the material comprising a second alloy, and repairing the undesirable feature of the formed article by adding the material. In the embodiment, the repaired formed article includes a substantially uniform grain structure between the formed article and the added material.

In another exemplary embodiment, a repaired or enlarged powder metallurgical article includes a formed article comprising a first alloy and a material comprising a second alloy. In the embodiment, the material is welded to the formed article. The repaired or enlarged powder metallurgical article includes a substantially uniform grain structure between the formed article and the material.

BRIEF DESCRIPTION OF THE DRAWINGS

Wherever possible, the same reference numbers will be used throughout the drawings to represent the same parts.

DETAILED DESCRIPTION OF THE INVENTION

Provided is a powder metallurgy welding process for forming an enlarged or repaired powder metallurgical article. The enlarged or repaired powder metallurgical article is formed by a formed article and a material. The formed article can be increase in size or have undesirable features repaired to form the enlarged or repaired powder metallurgical article. Embodiments include a formed powder metal alloy and additional alloy added to the formed powder metal alloy having a substantially uniform grain structure, higher material utilization due to lower levels of in-process scrap, increased uniformity of grain structure throughout the article, the ability for improved repair of field-run hardware, increased ability to utilize nickel-based alloys, such as Alloy 725.

In one embodiment, Alloy 725 is added to an article comprising Alloy 725 by welding. Alloy 725 is a known alloy composition and includes Nickel at 55.0-59.0% Chromium at 19.0-22.5%, Molybdenum at 7.0-9.5%, Niobium at 2.75-4.0% Titanium at 1.0-1.7%, Aluminum at 0.35 max %, at Carbon 0.03 max %, Manganese at 0.35 max %, Silicon at 0.20 max %, Phosphorus at 0.015 max %, Sulfur at 0.010 max %, and an Iron balance (the term "balance" is used for the purposes of identifying the predominant component of the balance).

Figure 1:
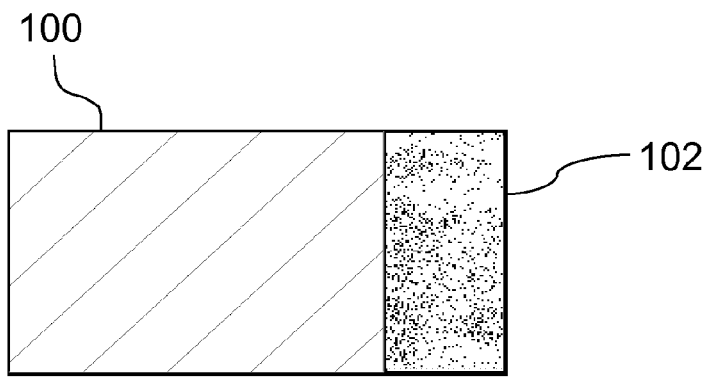
FIGS. 1 through 3 show schematic views of an exemplary embodiment of an article being increased in size according to an exemplary embodiment of a welding process.
Figure 5:
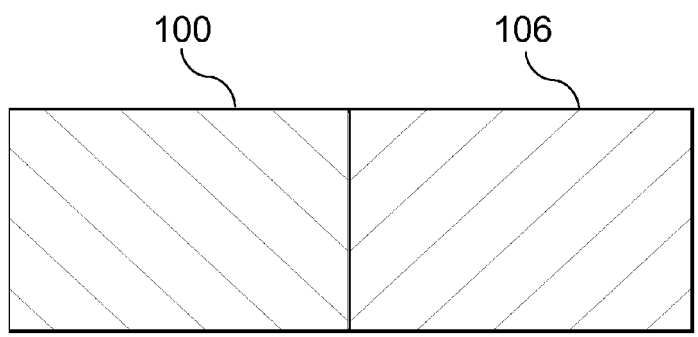
FIGS. 5 and 6 show schematic views of an exemplary embodiment of an article being increased in size according to an exemplary embodiment of a welding process.

Referring to FIGS. 1 and 5, an article 100 including a first alloy (for example, Alloy 725) can be formed by a powder metallurgy process. Upon being formed by the powder metallurgy process, article 100 includes the first alloy. In one embodiment, article 100 may include field-run alloy (as used herein, the term "field-run" refers to having been exposed to conditions associated with operation and/or use, for example, having experienced cycles of compressive and/or tensile forces). According to an exemplary embodiment of the disclosure, a material including a second alloy (for example, Alloy 725) can be welded to article 100 including the first alloy. In one embodiment, both the second alloy and the first alloy are Alloy 725.

Figure 2:
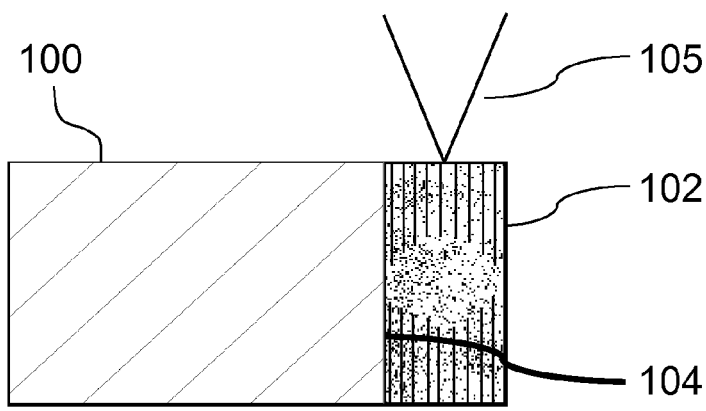
Figure 3:
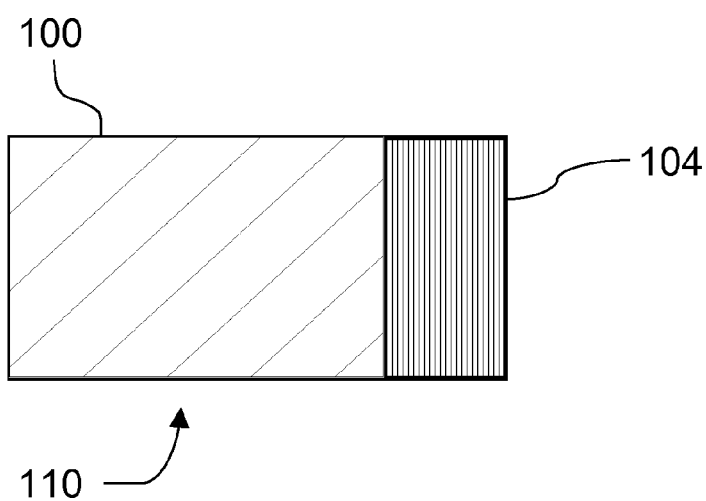

Referring to FIG. 1, the second alloy material can be in the form of a powder 102. Powder 102 can be formed by any suitable processes for forming a powder metal. Referring to FIGS. 2 and 3, a weld deposit 104 formed by welding the material to article 100 can be of substantially the uniform grain size as article 100. Upon the material being welded to article 100, an enlarged or repaired powder metallurgical article 110 is formed. Enlarged or repaired powder metallurgical article 110 can include substantially uniform grain structure.

Figure 6:
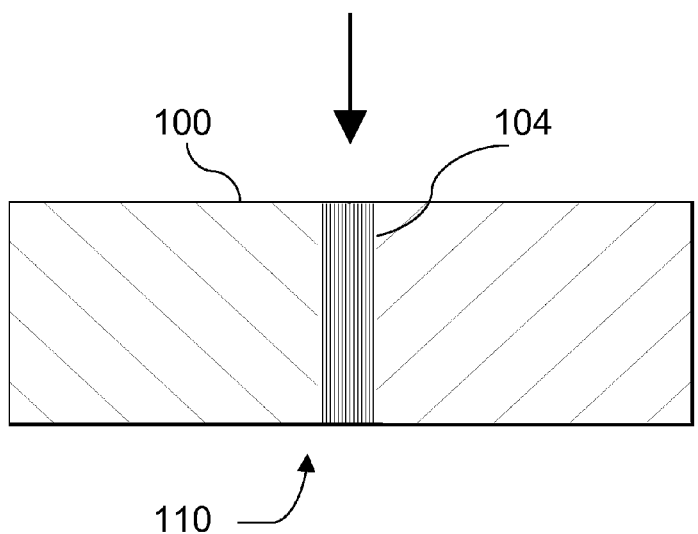

Referring to FIG. 5, in another embodiment, the material added can be in the form of a second article 106 formed by a powder metallurgy process. Article 106 includes the first alloy and can be formed by the same process as article 100 or any other suitable process. Referring to FIG. 6, upon the second article 106 being welded to article 100, weld deposit 104 is formed. Upon article 106 being welded to article 100, an enlarged or repaired powder metallurgical article 110 is formed. Enlarged or repaired powder metallurgical article 110 can include substantially uniform grain structure.

In one embodiment, article 100 can be formed through a powder metallurgy process by forming powder 102, positioning powder 102, evacuating powder 102, consolidated powder 102, hot working the consolidation powder 102, and forging to form article 100.

Forming powder 102 can include forming a melt of a first alloy (for example, Alloy 725) by any suitable powder metal processing (for example, vacuum melting induction processing, electroslag remelting processing, vacuum arc remelting processing). The melt can be formed under vacuum or in an inert environment resulting in a molten condition. While in the molten condition, the alloy can be converted into powder 102 by atomization or another suitable process to produce generally spherical particles of powder 102. Powder 102 can be sieved to a predetermined size. In one embodiment, the particles produced have diameters of predominantly 0.004 inch (about 0.100 mm) or smaller. The powder can be sieved to remove particles larger than 0.004 inch (about 0.100 mm) for the purpose of reducing the potential for defects in the forging process.

Once a sufficient amount of powder 102 has been produced, powder 102 can be positioned. Positioning can be configured for the desired size of article 100. Positioning can be performed in inert gas or vacuum. Upon being positioned, powder 102 can be evacuated and moderately heated (for example, above about 200° F. (about 93° C.)). Thereafter, powder 102 can be consolidated at a desired temperature, time, and pressure to produce a consolidation having a density of at least about 99.9% of theoretical. Consolidation can be accomplished by hot isostatic pressing, extrusion, or another suitable consolidation method.

The consolidation of powder 102 can be hot worked by any suitable technique (for example, upset plus drawing) to produce the desired size for forging. Article 100 can then be forged using any suitable techniques (for example, those applicable to Alloy 706 and Alloy 718). Article 100 can be inspected for undesirable features by any suitable process (for example, ultrasonic inspecting). Inspection can be followed by finish machining by any suitable process.

Referring to FIGS. 1 through 3, if article 100 is smaller than a desired size, laser beam or electron beam welding can be used for increasing the size of article 100 to form enlarged or repaired powder metallurgical article 110. Powder 102 can be produced and laser beam welded or electron beam welded to increase the size of desired areas of article 100 to a desired size. The energy density of energy beam 105 from the electron beam or laser beam welded can be controlled permitting grain size of weld deposit 104 to be consistent with the other portions of article 100. The energy density may be controlled by adjusting voltage, beam current, beam focus, beam oscillation, and/or travel speed. FIG. 1 shows article 100 and powder 102 positioned for increasing the size of article 100. FIG. 2 shows energy beam 105 being applied to article 100 thereby welding powder 102 to article 100 and forming weld deposit 104. Suitable energy beams may include electron beams, laser beams, or suitable other beams used for powder metallurgy processes. FIG. 3 shows article 100 having powder 102 welded to it, having increased size, and having weld deposit 104 thus forming enlarged or repaired powder metallurgical article 110.

Figure 4:
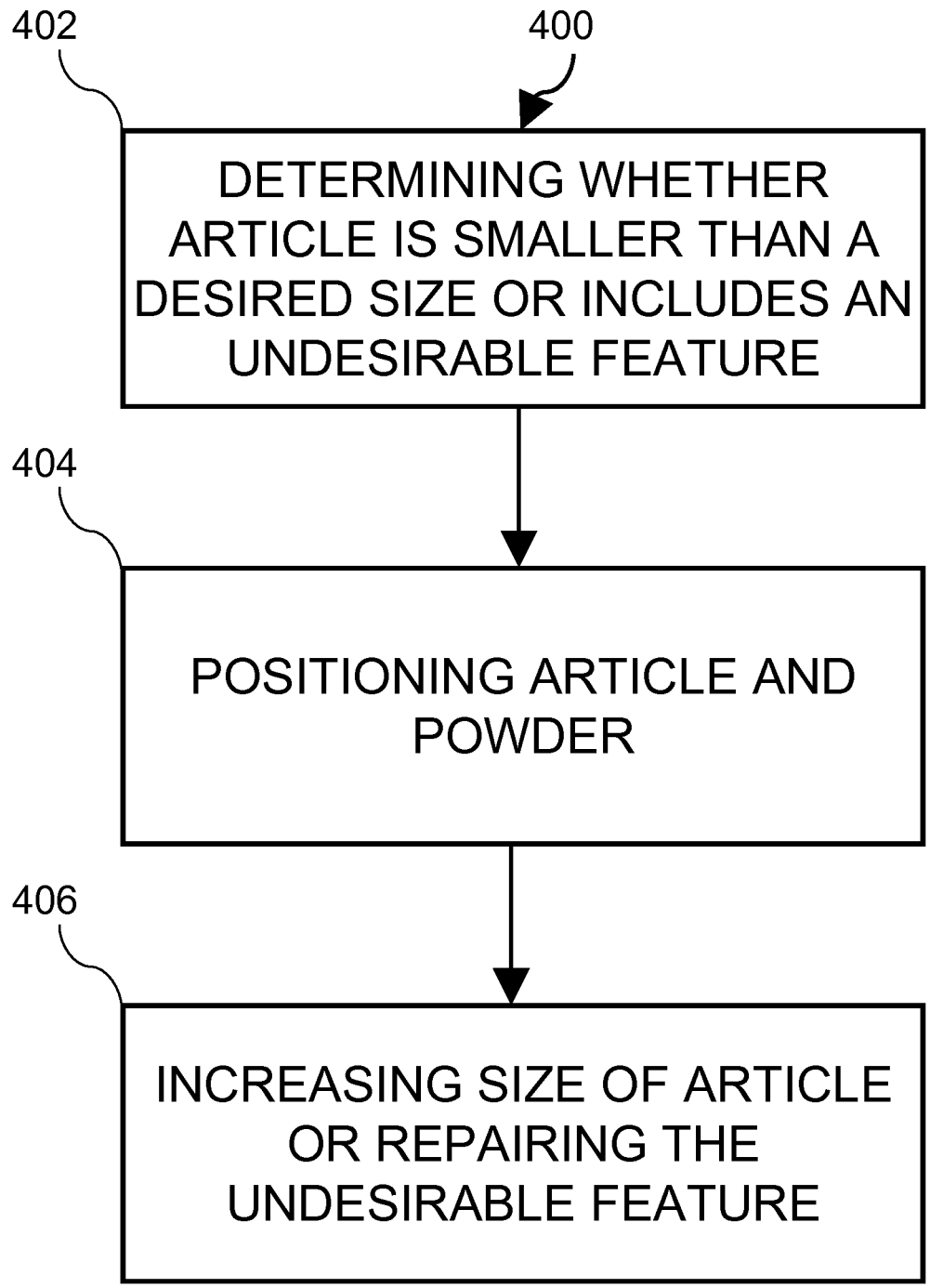
FIG. 4 shows a flow diagram according to an exemplary embodiment of a welding process.

Referring to FIG. 4, an exemplary method 400 of increasing the size of article 100 includes determining whether article 100 is smaller than a desired size (box 402), positioning article 100 and a material (box 404) including a second alloy, and increasing the size of article 100 to the desired size by welding the second alloy material (box 406) to the article. In method 400, article 100 includes Alloy 725. Determining whether article 100 is smaller than the desired size (box 402) can include determining whether a portion of article 100 is smaller than the desired size or whether the entire article 100 is smaller than the desired size. The determination can be made by any suitable technique (for example, visual inspection, computerized inspection, measurement of weight or volume, and/or comparison to standards). Positioning article 100 and additional alloy (box 404) can include any suitable positioning method. In method 400, the material includes a powder Alloy 725. Increasing the size of article (box 406) can be performed by laser beam welding or electron beam welding the material to article 100. Method 400 can optionally include selecting a predetermined energy density of an energy beam for the laser beam welding or the electron beam welding. Upon repaired or enlarged article being of a predetermined size, the process is complete and enlarged or repaired powder metallurgical article 10 is formed.

Referring to FIGS. 5 and 6, if article 100 is smaller than a desired size, then a second article 106 can be welded to article 100. It can be desirable that second article 106 be welded to article 100 when article 100 is substantially smaller than the desired size. Second article 106 can be formed, and thus, forged, in the same process as article 100. Upon positioning article 100 and second article 106 to be welded, article 100 and second article 106 can be welded to each other to increase the size of article 100 forming enlarged or repaired powder metallurgical article 110. The welding of article 100 and second article 106 can be performed by furnace brazing, fusion arc, fusion beam, or solid-state joining. Enlarged or repaired powder metallurgical article 110 may include weld deposit 104 and include substantially uniform grain structure throughout. FIG. 5 shows article 100 and second article 106 positioned for increasing the size of article 100. FIG. 6 shows article 100 having second article 106 welded to it, having increased size, and having weld deposit 104 thereby forming enlarged or repaired powder metallurgical article 110.

Figure 7:
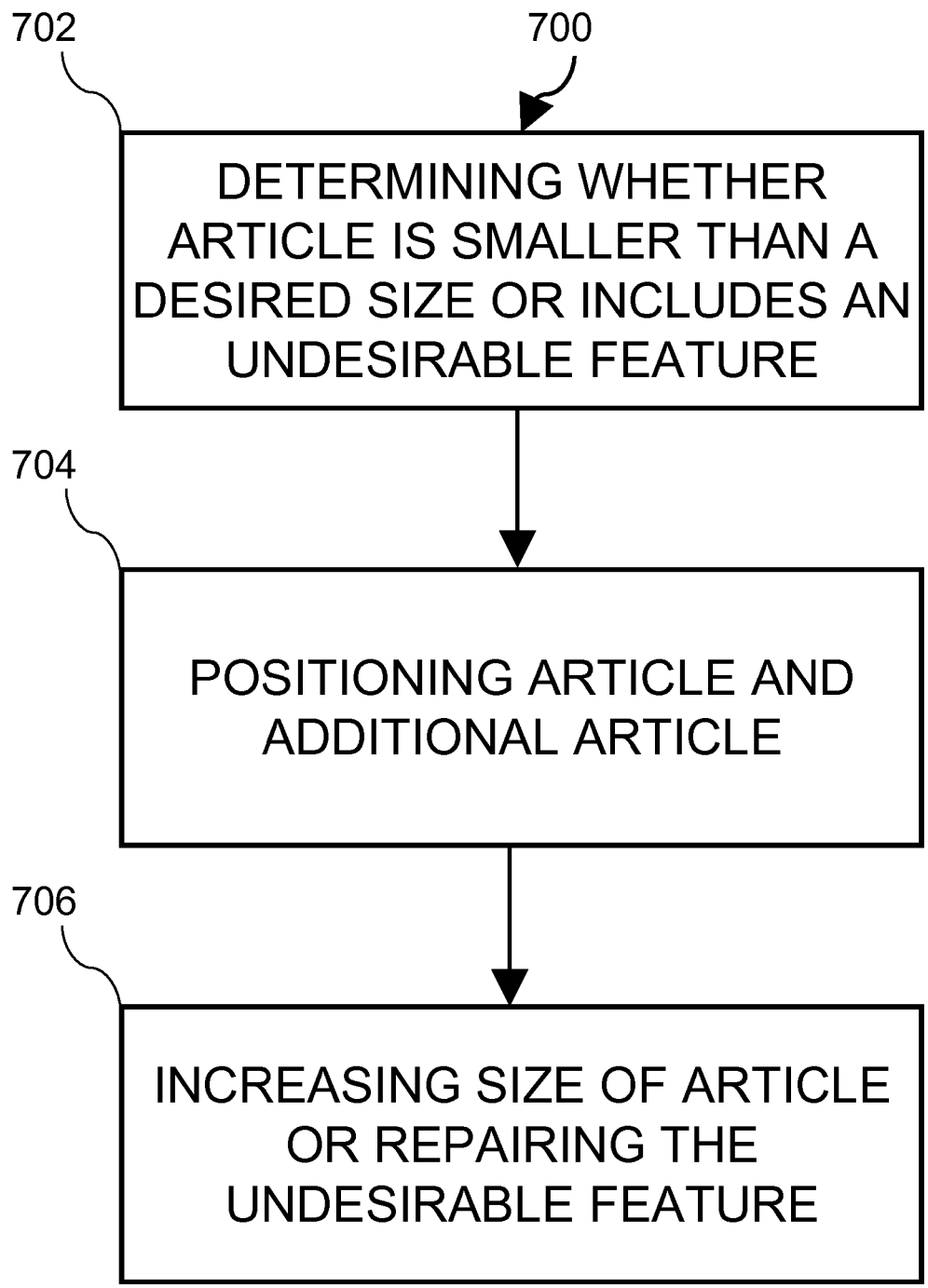
FIG. 7 shows a flow diagram according to an exemplary embodiment of a welding process.

Referring to FIG. 7, an exemplary method 700 of increasing the size of article 100 including a first alloy to form enlarged or repaired powder metallurgical article 110. Method 700 includes determining whether article 100 is smaller than a desired size (box 702), positioning article 100 and a material (box 704) including a second alloy, and increasing the size of article 100 to the desired size by adding the additional alloy (box 706) thereby forming enlarged or repaired powder metallurgical article 110. In method 700, article 100 includes forged alloy. Positioning article 100 and the material (box 704) can include any suitable positioning method. In method 700, the material includes additional article 106. Increasing the size of article 100 to the desired size by adding the material (box 706) can be performed by furnace brazing, fusion arc welding, fusion beam welding, or solid-state joining. In one embodiment, method 700 may include selecting a predetermined energy density of an energy beam for fusion beam welding. Upon repaired or enlarged article being of a predetermined size, the process is complete and enlarged or repaired powder metallurgical article 110 is formed.

If article 100 exhibits cracks, oxidation, corrosion, defects, and/or other undesirable features, then the material can be used for repairing the undesirable feature of article 100. As used herein the term "defects" refers to flaws or other undesirable aspects of the article but does not refer to an article being larger or smaller than a desired size. The material can be added to article 100 by brazing, fusion, or solid-state joining.

In one embodiment, the material for repairing article 100 may be powder 102 and can be added similar to the manner described above with reference to FIGS. 1 through 4. Laser beam or electron beam welding can be used for adding the second alloy to article 100. Powder 102 can be formed and laser beam welded or electron beam welded to build up desired areas of article 100 to repair and/or patch the undesirable feature. The energy density of energy beam 105 from the electron beam or laser beam can be controlled permitting grain size of weld deposit 104 to be uniform with the other portions of article 100 thereby forming enlarged or repaired powder metallurgical article 110.

In another embodiment, the material for repairing article 100 may be a second article 106 can be added similar to the manner described above with reference to FIGS. 5 through 7. Second article 106 can be welded to article 100 to form enlarged or repaired powder metallurgical article 110. Second article 106 can be formed, and thus, forged, in the same process as article 100. Upon positioning article 100 and second article 106 to be welded, article 100 and second article 106 can be welded to repair the undesirable feature. The welding of article 100 and second article 106 can be performed by furnace brazing, fusion arc, fusion beam, or solid-state joining The repaired article 100 may include weld deposit 104 and include substantially consistent grain size throughout article 100 thereby forming enlarged or repaired powder metallurgical article 110.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method of forming a powder metallurgical article, the method comprising:
   determining a size of a formed article, the formed article comprising a first alloy, the determining being by visual inspection, computerized inspection, measurement of weight, measurement of volume, comparison to a standard, or a combination thereof;
   positioning the formed article and a material, the material comprising a second alloy; and
   increasing the size of the formed article by adding the second alloy material; and,
   wherein the enlarged article includes a substantially uniform grain structure between the formed article and the added second alloy material.

2. The method of claim 1, wherein the increasing of the size of the formed article includes one or more of laser beam welding and electron beam welding.

3. The method of claim 2, further comprising selecting a predetermined energy density of an energy beam for the laser beam welding or the electron beam welding.

4. The method of claim 3, wherein the selection of the predetermined energy density of the energy beam permits control of grain size of a weld deposit formed by the material being welded to the formed article.

5. The method of claim 1, wherein the increasing of the size of the formed article includes welding the material to the formed article, the material including a second formed article.

6. The method of claim 5, wherein the welding of the material to the formed article is performed by furnace brazing or fusion arc welding.

7. The method of claim 5, wherein the welding of the material to the formed article is performed by fusion beam welding.

8. The method of claim 5, wherein the welding of the material to the formed article is performed by solid-state joining.

9. The method of claim 1, wherein the formed article and the material include Nickel at 55.0-59.0%, Chromium at 19.0-22.5%, Molybdenum at 7.0-9.5%, Niobium at 2.75-4.0%, Titanium at 1.0-1.7%, Aluminum at 0.35 max %, at Carbon 0.03 max %, Manganese at 0.35 max %, Silicon at 0.20 max %, Phosphorus at 0.015 max %, Sulfur at 0.010 max %, and an Iron balance.

10. A method of forming a powder metallurgical article, the method comprising:
    determining a size of a formed article, the formed article comprising a first alloy, the determining being by visual inspection, computerized inspection, measurement of weight, measurement of volume, comparison to a standard, or a combination thereof;
    positioning the formed article and a material, the material comprising a second alloy; and
    increasing the size of the formed article by adding the second alloy material; and,
    wherein the enlarged article includes a substantially uniform grain structure between the formed article and the added second alloy material;
    wherein the formed article and the material include Nickel at 55.0-59.0%, Chromium at 19.0-22.5%, Molybdenum at 7.0-9.5%, Niobium at 2.75-4.0%, Titanium at 1.0-1.7%, Aluminum at 0.35 max %, at Carbon 0.03 max %, Manganese at 0.35 max %, Silicon at 0.20 max %, Phosphorus at 0.015 max %, Sulfur at 0.010 max %, and an Iron balance.

11. The method of claim 10, wherein the increasing of the size of the formed article includes one or more of laser beam welding and electron beam welding.

12. The method of claim 11, further comprising selecting a predetermined energy density of an energy beam for the laser beam welding or the electron beam welding.

13. The method of claim 12, wherein the selection of the predetermined energy density of the energy beam permits control of grain size of a weld deposit formed by the material being welded to the formed article.

14. The method of claim 10, wherein the increasing of the size of the formed article includes welding the material to the formed article, the material including a second formed article.

15. The method of claim 14, wherein the welding of the material to the formed article is performed by furnace brazing or fusion arc welding.

16. The method of claim 14, wherein the welding of the material to the formed article is performed by fusion beam welding.

17. The method of claim 14, wherein the welding of the material to the formed article is performed by solid-state joining.

* * * * *